(12) United States Patent
Adams

(10) Patent No.: US 7,742,929 B1
(45) Date of Patent: Jun. 22, 2010

(54) SYSTEM AND METHOD FOR DETERMINING REVENUE-BASED AGE

(75) Inventor: Mark Adams, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1249 days.

(21) Appl. No.: 11/280,690

(22) Filed: Nov. 16, 2005

(51) Int. Cl.
*G06Q 10/00* (2006.01)
(52) U.S. Cl. ............................................. 705/1; 705/10
(58) Field of Classification Search .................. 705/1
See application file for complete search history.

(56) References Cited

U.S. PATENT DOCUMENTS

| | | | | |
|---|---|---|---|---|
| 6,321,205 | B1* | 11/2001 | Eder ............................... | 705/7 |
| 7,092,929 | B1* | 8/2006 | Dvorak et al. .................. | 705/28 |
| 2003/0229552 | A1* | 12/2003 | Lebaric et al. ................. | 705/35 |
| 2004/0128112 | A1* | 7/2004 | Mikytuck et al. ............ | 702/190 |
| 2007/0265907 | A1* | 11/2007 | Adduci et al. .................. | 705/10 |

OTHER PUBLICATIONS

NetMBA, "The Product Life Cycle", Aug. 2, 2002, http://web.archive.org/web/20040803102519/www.netmba.com/marketing/product/lifecycle/.*
Definitions of Revenue and Average by Webster, http://www.webster.com.*
Definitions of Average Revenue and Average Revenue Product by AmosWeb, http://www.amosweb.com.*
Definitions of Revenue and Average Revenue by Investopedia, http://www.investopedia.com.*
Breskin, Ira, "Special Report: Retail Solutions—Price Optimization Software Helps Bolster Gross Margins", Apr. 2004, 7 pgs.
Kandybin, Alexander, et al., "Raising Your Return on Innovation Investment," Resilience Report, May 11, 2004, 14 pgs.
Kotelnikov, Vadim, "Innovation Metrics The Basis for Timely Decisions," http://www.1000ventures.com/business_guide/innovation_system_metrics.htmlMay 11, 2005, 3 pages.
Cohan, Peter S., "Innovation Scorecard," http://petercohan.com/innovation-scorecard, May 11, 2005, 2 pages.
"Return on Investment Capital—ROIC," Answers.com, http://www.answers.com/topic/return-on-capital, May 11, 2005, 4 pages.
"Return on Investment—ROI," Answers.com, http://www.answers.com/main/ntquery:jsessionid=iwok743171n8?method=4&dsid=2222&..., May 11, 2009, 6 pages.

(Continued)

*Primary Examiner*—Janice A. Mooneyham
*Assistant Examiner*—Gerardo Araque, Jr.

(57) ABSTRACT

A computer implemented system for determining average product revenue is provided. The system includes at least one data store that is operable to maintain revenue data for a plurality of products. The system also includes a processor programmed to calculate a first revenue-based age metric based on revenue from a first product over a period, an age factor for the first product, and revenue for a group of products over the period. The processor is further programmed to calculate a second revenue-based age metric based on revenue from a second product over the period, an age factor for the second product, and revenue for the group of products over the period. The first and second revenue-based age metrics may be used to compare the first and second products.

16 Claims, 3 Drawing Sheets

OTHER PUBLICATIONS

"Culpepper HIgh-Tech Financial Ratios," Culpepper.com, http://www.culpepper.com/Ratios2/info/ratios.aspx, May 11, 2005, 5 pages.

"Benchmark Your Firm's Revenue with Culpepper High-Tech Financial Ratios," Culpepper.com, http://www.culpepper.com/info/HTFR/RevenueRatios.asp, May 11, 2005, 2 pages.

Reed, Sandy, "IT Spending Compared to Revenue: Relevant Ratio or Meaningless Metric?," InfoWorld in Print, http://infoworld.com/cgi-bin/displayNew.pl?/reed/990405sr.htm, May 11, 2005, 3 pages.

Saunders, Christopher, "Avenue A Urges Advertisers To Think 'Cost-Per-Revenue'," ClikZ.com, http://clikz.com/news/article.php/779011, May 11, 2005 3 pages.

Neely, David, et al., "Innovation's New Performance Standard," Strategy+Business, http://www.strategy-business.com/resiliencereport/resilience/rr00005?pg=1, May 11, 2005, 2 pages.

Neely, David, et al., "Innovation's New Performance Standard," Strategy+Business, http://www.strategy-business.com/resiliencereport/resilience/rr00005?pg=0, May 11, 2005, 2 pages.

\* cited by examiner

SYSTEM AND METHOD FOR DETERMINING REVENUE-BASED AGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to making investment decisions based on a business enterprise's innovative health. More particularly, embodiments of the present invention provide systems and methods for determining a revenue-based age metric and making business decisions based on it.

BACKGROUND OF THE INVENTION

A business enterprise makes significant investments in bringing new products or services to market. New products and services may generate premium prices upon introduction to the market, based on an element of uniqueness or newness. Such premiums often drive business enterprises to innovate and invest in new products and services. With competition, however, the initially high prices erode over time. Such marketplace dynamics cause innovation to occur in cycles.

Given the cyclical nature of innovation and pricing of products, there is a need for executives to be able to assess their enterprise's innovative efficacy and relative health. Innovative efficacy is a measure of measure success in bringing new products to market, how fast new products come to market, and how much new revenue they generate. Relative health is a measure of current relative success between groups of products. Counting the number of new products and services is an inadequate measure for objectively measuring innovative health, because a count of new products does not reflect the marketplace success of a new product nor how long it has been on the market.

SUMMARY OF THE INVENTION

A computer implemented system for determining average product revenue is provided. The system includes at least one data store that is operable to maintain revenue data for a plurality of products. The system also includes a processor programmed to calculate a first revenue-based age metric based on revenue from a first product over a period, an age factor for the first product, and revenue for a group of products over the period. The processor is further programmed to calculate a second revenue-based age metric based on revenue from a second product over the period, an age factor for the second product, and revenue for the group of products over the period. The first and second revenue-based age metrics may be used to compare the first and second products.

According to another embodiment, a method of analyzing products for investment decision making is provided. The method includes determining a revenue-based age metric for a plurality of products and analyzing the revenue-based age metrics of the plurality of products. The method further provides for basing investment decisions on the analysis of the revenue-based age metric.

In still another embodiment, a method for analysis based on a revenue-based age metrics is provided. The method includes determining a product revenue-based on revenues generated from a product over a period. The method provides for determining a group revenue-based on revenues generated from a group of products over the period. The method also includes calculating a revenue-based age metric associated with the product. The revenue-based age metric is based on the product revenue of the product, the group revenue of the group of products, an age factor, and the period. The revenue-based age metric may be used to analyze the product.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
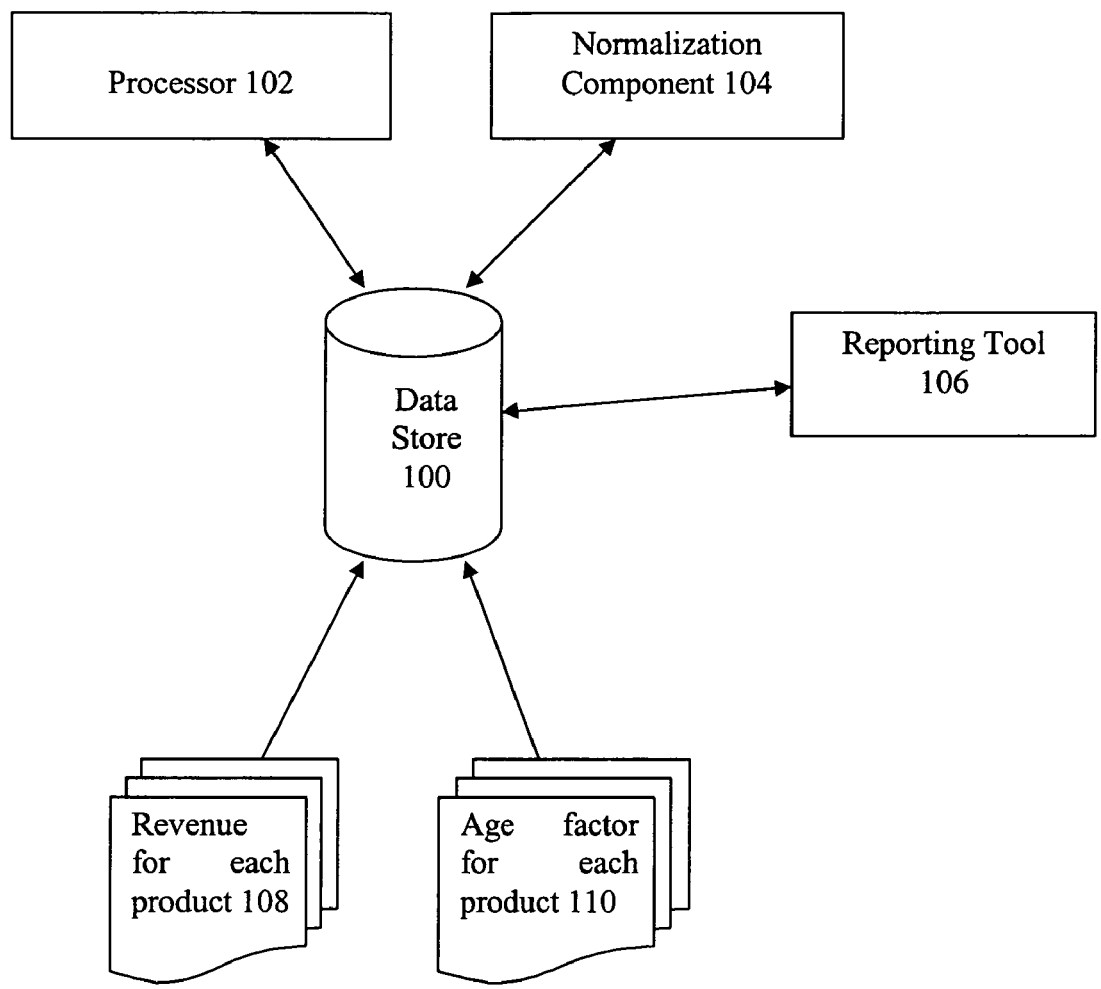
FIG. 1 is a block diagram of a system for calculating revenue-based age in accordance with one or more embodiments.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In an enterprise, substantial funds are devoted to research and development of innovative products and services. Business enterprises are driven by competition to continuously innovate, and future investments may be based on strategic decisions relating to whether past investments in innovation paid off by producing revenues. Thus, a metric for objectively evaluating the return on investment in research and development is desirable.

Furthermore, a metric for evaluating the return on investment in terms of age of a product as well as the overall revenue is useful. Any given product has a life cycle return, in that the product generally makes relatively more revenue while it is young, and as time passes, revenues may drop off due to competition, other innovations, and market factors. A metric that takes this life cycle return into account is useful in making future decisions in research and development investments, since the metric takes into account the changes in revenues for products over time, including those areas of research and development that have returns for a longer period of time, and the like. Factoring in the age of a product permits decision makers to see, for example, how quickly revenue is being realized from research and development investments and how well research and development funds are being invested.

Such a metric has some limited usefulness in terms of evaluating a single product in a vacuum. The metric of the present disclosure is a useful relative measurement tool in evaluating a group or portfolio of products or services. The metric may be applied, for example, but not limited to, to compare two individual products, to compare a group of products classified by area of technology, to compare products from within a group of products produced by a division or business unit, or to compare between products or groups of products produced by different divisions or business units. The metric of the present disclosure may, since it factors in age, be applied to compare a group of products to itself over time.

Embodiments of the present disclosure provide methods and systems for determining a revenue-based age metric that enterprise executives may use in evaluating products and its innovative efficacy or relative health. The present disclosure allows enterprise executives to analyze historical data and/or view current status of products or product groups to establish patterns of success and failure in innovation that may be considered when planning and making investment choices regarding research, development, and innovation in the future.

FIG. 1 shows a block diagram of a computer implemented system for calculating a revenue-based age metric in accordance with one or more embodiments. This computer implemented system includes a data store 100, a processor 102, a normalization component 104, and a reporting tool 106. The data store 100 is configured to store revenue data, including, but not limited to, 1) revenue 108 generated by sales of a portfolio of products and 2) an age factor 110 for each product sold. The revenue 108 stored in the data store 100 may comprise data tracked over an extended period of time and may even comprise revenue for each product (of the portfolio) since the date it was released on the marketplace, or from the date that the first dollar was invested in each product. The period tracked for the revenue may be established according to the time period which executives wish to evaluate. The age factor 110 for each product sold may comprise the age of a product measured from the date of its release on the marketplace. The age factor 110 alternatively may comprise the age of a product measured from the date the first dollar was invested in research and development for the product. The age factor 110 alternatively may comprise the average time between first dollar and release date, for a composite of the two.

The age factor 110 for each product in the portfolio may be capped at a threshold value. The threshold value may be predetermined, or set as needed in order to achieve results in a manner most helpful to the present analysis of innovative health. For example, for an older, well-established business, some of its products may have very old revenue because the product has been producing revenue for a relatively long time. In such a situation, the older products may vastly outweigh newer products in calculating a revenue-based age metric. To maintain the metric as a measure of innovative efficacy and relative health over time, the age of old products may then be capped (for example, at 10 years or 20 years) so as to treat all products older than a certain age as "mature" and weight them relative to newer product, so that the impact of newer innovations may be more easily viewed and evaluated. In some embodiments, the weighting may cause the trends of older products to be minimized, while in still other embodiments, it may be useful for older products to be omitted from the analysis.

The age factor 110 of the metric alternatively may comprise the absolute age, as determined by any of the periods described above, weighted by a multiplier that, when applied to a product's age, classifies products in product age groups, representing all the products that originated during a similar time period. The weighted multiplier may be predetermined or may be set at the beginning of each new analysis as needed. With the weighted multiplier, executives may lessen the impact of older products on the revenue-based age metric, in order to more closely view and evaluate the effect of newer products on the enterprise's innovative efficacy. The multiplier is supplied by the normalization component 104 and stored in the data store 100.

The data store 100 may also be configured to associate products with a specific product age generation. In evaluation of trends, executives may analyze the impact of groups of products (i.e., portfolios) originating around the same time, track them back to that generation consistently, and thereby objectively evaluate the enterprise's overall efficacy and relative health in innovation during that generation.

The data store 100 may also be configured to store results, such as metrics for objective evaluation of an enterprise's innovative health, calculated by the processor 102 and displayed on the reporting tool 106. The data store 100 may also be configured to maintain results and revenue data over a period of time, and may be configured to store results and revenue data in sets for a rolling window of time, as would be well known by one of ordinary skill in the art.

The processor 102 is programmed to calculate a revenue-based age metric using the revenue data stored in the data store 100. In an embodiment, the processor 102 obtains data, including revenue 108 for a given time period and an age factor for each product 110. The time period may be annually, quarterly, monthly, weekly, or any other period of time that may be used in evaluating the innovative efficacy and relative health of a business enterprise. In an embodiment, the time period may be selected before beginning analysis. The processor 102 is programmed to calculate the revenue-based age metric according to an algorithm as desired, depending on which aspect(s) executives will evaluate. For example, the factors affecting the revenue-based age metric may change according to whether executives will evaluate the comparative change in the efficiency at generating revenues, whether young products are growing revenues at a faster rate than older products, whether the average product revenue age is decreasing due to price erosion in older products rather than growth of revenues from new products and the like. By calculating the revenue-based age metric regularly and often, executives can view trends as closely as desired and respond by adjusting strategies or changing them entirely.

The processor 102 may be programmed to multiply the revenues 108 for each product for the period by the age factor 110 of the product and sum the results for all products. The processor divides the result by the sum of all assessed product revenues in the period in order to calculate an average age of the revenues, i.e., an revenue-based age metric. The processor 102 may alternatively be programmed to calculate the average age of the revenues as described above, with the age factor 110 for each product weighted by a multiplier provided by the normalization component 104.

The normalization component 104 includes functionality to proportionally adjust (i.e., normalize) the value of specific products of the plurality of products by a weighted factor. The normalization component 104 might, for example, apply a weighted multiplier to products older than a certain age, such that in calculation of revenue-based age metrics, older products are given less weight than younger products which are more timely to an analysis of innovative health. The normalization component 104 might, alternatively, apply a weighted multiplier in order to classify products into various groups or generations, based on their ages, for purposes of calculating and comparing revenue-based age metrics.

The reporting tool 106 includes functionality to generate and, if desired, display reports of the data stored in the data store 100. Reports provided by the reporting tool 106 may be in a printed format or may alternatively be displayed on a computer screen. A report from the reporting tool 106 may, for example, display a graphical representation of the trend of a portfolio of products or services according to the age-based revenue metric, such as average product revenue age, over time. A downward trend in such a report might indicate that, for the analyzed portfolio, revenues are coming increasingly from relatively new products, stemming from revenue erosion in older products, or relatively increasing revenues from newer innovative products. An upward trend in such a report might indicate that, for the analyzed portfolio, revenues resulting from new products are not growing as quickly as revenues from older products. Such an upward trend may indicate that expenditures in innovation during the period associated with younger products are not producing revenue as expected. The reporting tool might display the trend in the revenue-based age metric in a rolling window, displaying, for example, an eighteen month window of time at any point along a timeline, where the window may be viewed for any specific point in time along the timeline.

Figure 2:
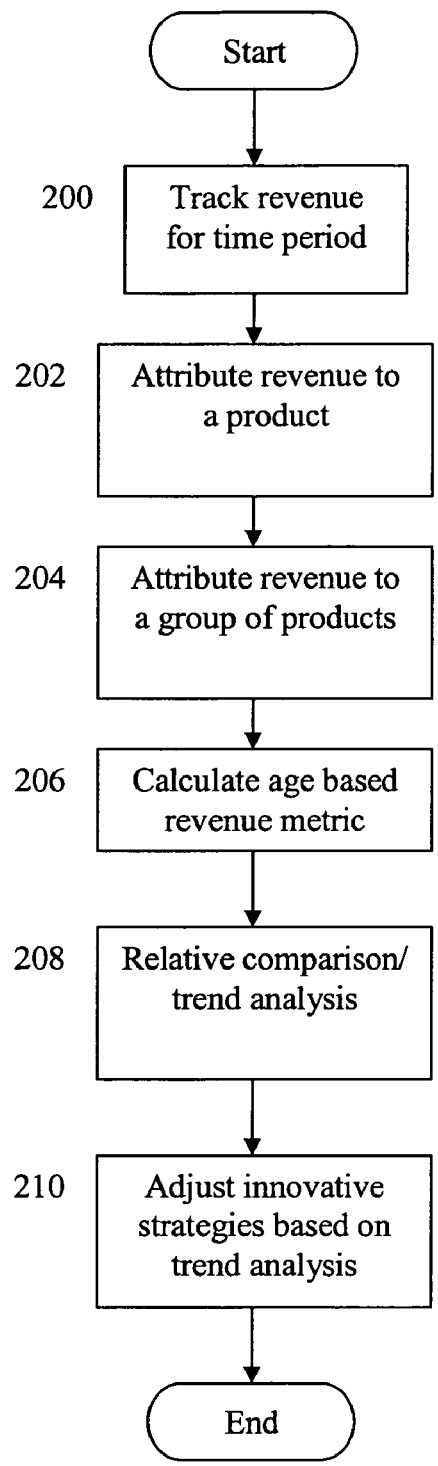
FIG. 2 is a flow diagram of a method for calculating revenue-based age in accordance with one or more embodiments.

FIG. 2 is a flow diagram of a method for determining a revenue-based age metric in accordance with one or more embodiments. In block 200, all revenue to a business enterprise is tracked for a specific time period, which may be a week, a month, a quarter, a year or other length of time. In an embodiment, the revenue may be tracked according to a given portfolio of products or services. Tracked revenue is maintained in the data store 100. Revenue may be followed manually or by automatic electronic means, such as a software program operable to track revenue throughout the enterprise's system.

In block 202, revenue generated by sales of a particular product is attributed to the product. By linking revenue to each individual product that generated it, one may see the trends over time for the particular product as well as the particular product in the context of other products from the same portfolio or other groups. In block 204, revenue generated by sales, for example, of all products or perhaps those having elements in common are attributed to those products as a portfolio or group. For example, revenue from various products may be attributed to a portfolio of all products introduced or developed during a certain time period. For example, revenue generated by sales of products may be attributed to a portfolio of products that were introduced or developed during the same particular quarter. In this way, revenue is attributed to a product age generation for products that are all close in age.

Alternatively, in block 204, revenue generated by sales of products having other elements in common may be attributed to the products as a group. For example, revenue from various products of a particular technology or application may be attributed to the products as a group. In this way, revenue may be attributed to specific types of innovation within an enterprise that are all related in terms of technology or application, and trends in average revenue age in portfolios of similar innovations may be analyzed. In another example, revenue may be attributed to a product or portfolio based on the originating business unit, division, etc.

In block 206, the revenue-based age metric is calculated based on the revenue and age of products sold. In an embodiment, the revenue-based age metric may be the average product revenue age, measured in units of time. According to an embodiment of the present disclosure, the revenue-based age metric is calculated according to the following formula:

$$\text{Revenue Based Age Metric} = \frac{ProductRevenue * AgeFactor}{\sum_{1}^{n=NumberOfProducts} ProductRevenue_n}$$

The Product Revenue represents data tracked over some period of time and may even comprise revenue for the product over its lifetime. The Age Factor represents the age of a product measured from some point, such as the date of its release on the marketplace. The age of a product could also be measured from the date of the first capital expenditure for the product, the date of the product's release on the market, or the average time between first dollar of capital expenditure and market release date, for example. Alternatively, the age factor 110 may represent the age, as determined by any of the periods described above, weighted by a multiplier that, when applied to a product's age. The age factor 110 may additionally be capped, for example at 10 years, 20 years or the like, as discussed previously.

In block 208, a relative comparison or trend analysis may be performed. A relative comparison between two points may be performed for two revenue-based age metrics. A relative comparison might be useful, for example, for comparing the innovative success between groups of products for different divisions of an enterprise or portfolios of products in different areas of technology. For example, an example product "A" that has been selling for 7 years may have recent annual sales of $1,000,000, while sales for all product for an example organization were $10,000,000. The representative formula might have the following result: (1,000,000*7)/10,000,000=0.7 years (the revenue-based age metric result). In this instance, an average product revenue metric of 0.7 years might suggest that product "A" is a fairly well established product. By comparison, a product "B" has recent annual sales of $500,000 and has been selling for 2 years with the same organization. The formula for product "B" is: (500,000*2)/10,000,000=0.1 years.

The average product revenue metric of 0.1 might suggest a newer product, but one with the potential to be a successful product. It will be readily apparent to one skilled in the art that manipulation or modification of the formula will provide potential for different insight into the product revenue age. For example, by dividing instead of multiplying the age of the product by the product's revenue in the above formula, a different set of metrics is provided with different potential for analysis. According to the previously used scenario, for product "A", the formula would be:

(1,000,000/7)/10,000,000=0.014 while for product "B" the formula would be:

(500,000/2)/10,000,000=0.025

This formula may create emphasis on near-term revenue. For example, analysis of these revenue-based age metrics might suggest that product "A" is somewhat stagnant and product "B" is very successfully and has significant potential.

The formula for revenue-based age analysis may be altered in a myriad of other ways and provide numerous metrics emphasizing various aspects of an organization's products for analysis and guidance for future investments.

Further, the relative comparison might be useful for comparing the same time period for the same product or product group in different years, such as comparing between successive holiday seasons or the like, or other comparisons that are useful to making decisions for future investment in innovative research and development. Similarly, the relative comparison might be useful for comparing the same time period for the different products or product groups in different years. A trend analysis may be carried out by plotting multiple metric values for various products or groups of products over time. Multiple metric values plotted out over time reflect a positive or negative trend in the innovative efficacy or relative health of an enterprise. By using trend analysis, imitating actions taken during successful periods of innovation in the past, and avoiding repeating costly periods of failure, executives may improve the innovative efficacy and relative health of the enterprise. Comparisons may be further aggregated for more detailed analysis or higher level analysis as desired.

In block 210, strategies may be adjusted or changed entirely in response to the comparison or trend emerging in block 208. Such strategies may include financial strategies involving how to allocate funds for innovation. By looking at products in or product groups in particular, that were successful innovations, in terms of the revenue-based age metric of the present disclosure, business executives may make objective decisions about how to invest funds in innovation, imitating past success models. Furthermore, using the revenue-based age metric, business executives may set target rates of revenue based on age, and objectively grade the enterprise's progress towards targets.

One aspect of the present disclosure is that repeating the method for determining an revenue-based age metric results in regular updates for the values of revenue-based age metric, and on-going trend analysis that allows executives to alter variables affecting the metric and measure their impact in an objective manner. An on-going analysis using the revenue-based age metric may be useful to executives in a rolling window format, so that historical information on innovative success is accessible and may be used in regular, objective decision making, rather than leaving decisions about innovation to speculation and gut instincts.

Figure 3:
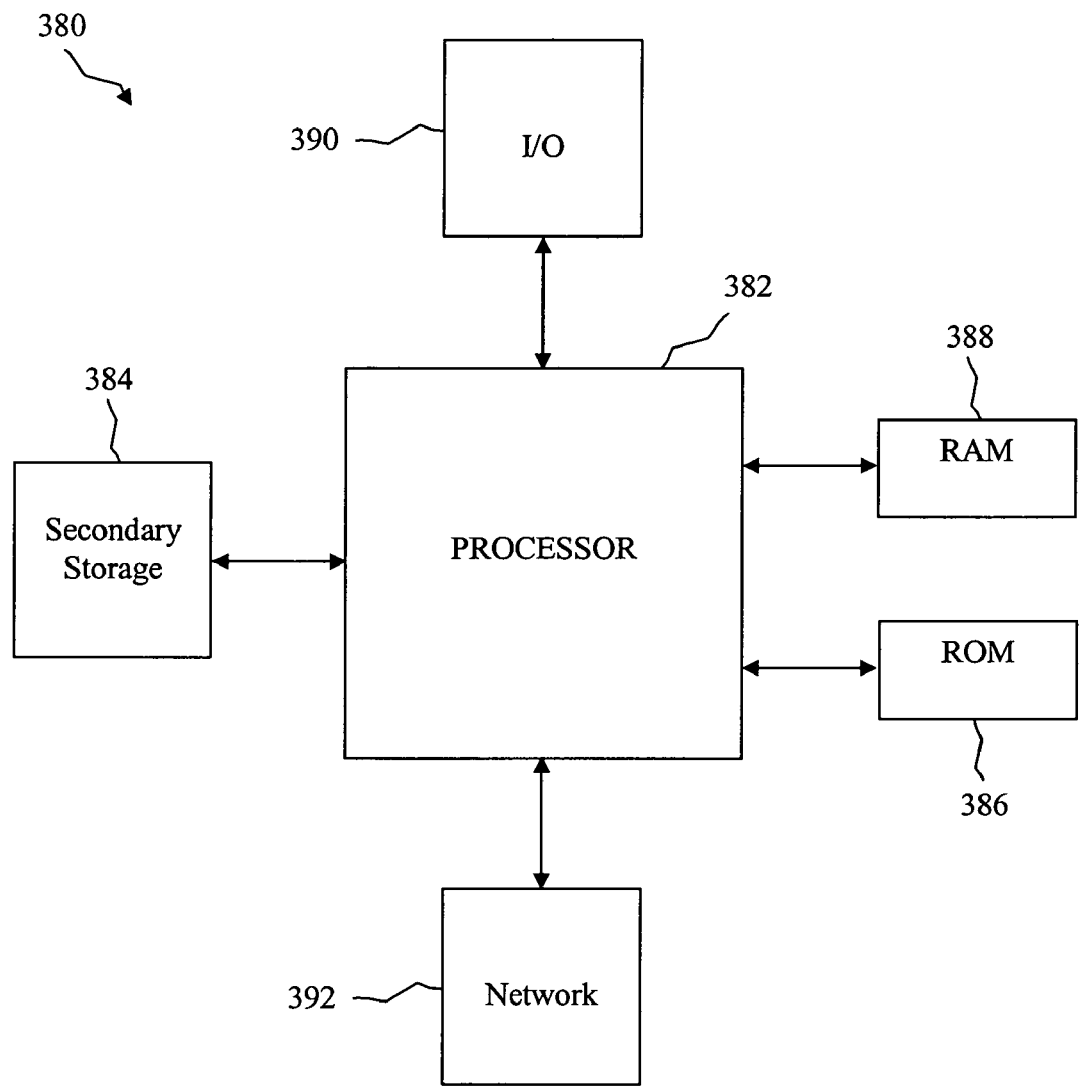
FIG. 3 shows a general purpose computer system suitable for implementing one or more embodiments.

The system and method described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented system, comprising:
   at least one data storage device that maintains revenue data for a plurality of products;
   a processor programmed to calculate a first revenue-based age metric based on first revenue data from a first product over a period, a first age factor for the first product, and revenue data for a group of products over the period, the processor further programmed to calculate a second revenue-based age metric based on second revenue data from a second product over the period, a second age factor for the second product, and the revenue data for the group of products over the period;
   wherein the first revenue-based age metric and the second revenue-based age metric are each calculated based on the following equation:

$$\text{Revenue Based Age Metric} = \frac{ProductRevenue * AgeFactor}{\sum_{1}^{n=NumberOfProducts} ProductRevenue_n},$$

wherein n is the number of products in the group of products, the sum of $ProductRevenue_n$ from 1 to n is the revenue data for the group of products over the period, ProductRevenue is the first revenue data for the first revenue-based age metric and the second revenue data for the second revenue-based age metric, and AgeFactor is the first age factor for the first revenue-based age metric and the second age factor for the second revenue-based age metric; and
   a reporting component configured to aggregate the revenue data of the group of products and a plurality of the first and the second revenue-based age metrics and display on a computer screen one or more trends in the aggregated the revenue data of the group of products and the aggregated plurality of the first and the second revenue-based age metrics.

2. The computer implemented system of claim 1, wherein the age factor is based on when the product to which it pertains began generating revenues.

3. The computer implemented system of claim 1, wherein the age factor is the time that has passed since the product to which it pertains was first offered for sale.

4. The computer implemented system of claim 1, wherein the age factor is the time that has passed since the start of capital expenditures for the product to which it pertains.

5. The computer implemented system of claim 1, wherein the age factor is a product age multiplied by a predetermined weight component.

6. The computer implemented system of claim 1, wherein the age factor is capped at a predetermined threshold.

7. The computer implemented system of claim 1, wherein the one or more trends in the aggregated plurality of revenue data of the group of products and the aggregated plurality of the first and the second revenue-based age metrics include at least one selected from the group consisting of: a downward trend that indicates that the revenues are coming from the first product or the second product; and an upward trend that indicates that the revenues are coming from the group of products.

8. A method for analysis based on a revenue-based age metric, comprising
   determining, by a processor executing instructions stored on a computer-readable medium, a product revenue based on revenues generated from a product over a period;
   determining, by a processor executing instructions stored on a computer-readable medium, a group revenue based on revenues generated from a group of products over the period by summing an assessed product revenue over the period of all products in the group of products; and
   calculating, by a processor executing instructions stored on a computer-readable medium, a revenue-based age metric associated with the product, the revenue-based age metric based on the product revenue of the product, the group revenue of the group of products, an age factor of the product, and the period, the revenue-based age metric used to analyze the product;
   wherein calculating a revenue-based age metric comprises:
      multiplying, by a processor executing instructions stored on a computer-readable medium, the product revenue of the product by the age factor of the product to produce a first result; and
      calculating the revenue-based age metric by dividing the first result by the group revenue.

9. The method of claim 8, wherein the age factor is based on a release of the product.

10. The method of claim 8, wherein the age factor is based on a start of capital expenditures for a product.

11. The method of claim 8, wherein the age factor is a factor selected to promote analysis of the product based on the revenue of the product and the age of the product.

12. The method of claim 8, wherein the period is selected from a group of periods consisting of a weekly period, a monthly period, a quarterly period, an annual period, and a period of multiple years.

13. The method of claim 8, wherein the group revenue is further defined as all revenue for all products in the group over the period.

14. The method of claim 8, wherein the group of products is further defined as a group of products related to the product.

15. The method of claim 14, wherein the group of products includes all products less than 5 years of age.

16. The method of claim 14, wherein the group of products includes all products less than 10 years of age.

* * * * *